Nov. 17, 1931.  P. E. KLOPSTEG  1,832,128
PROCESS AND APPARATUS FOR MEASURING MAGNETIC FIELD INTENSITIES
Filed Dec. 31, 1928  3 Sheets-Sheet 3

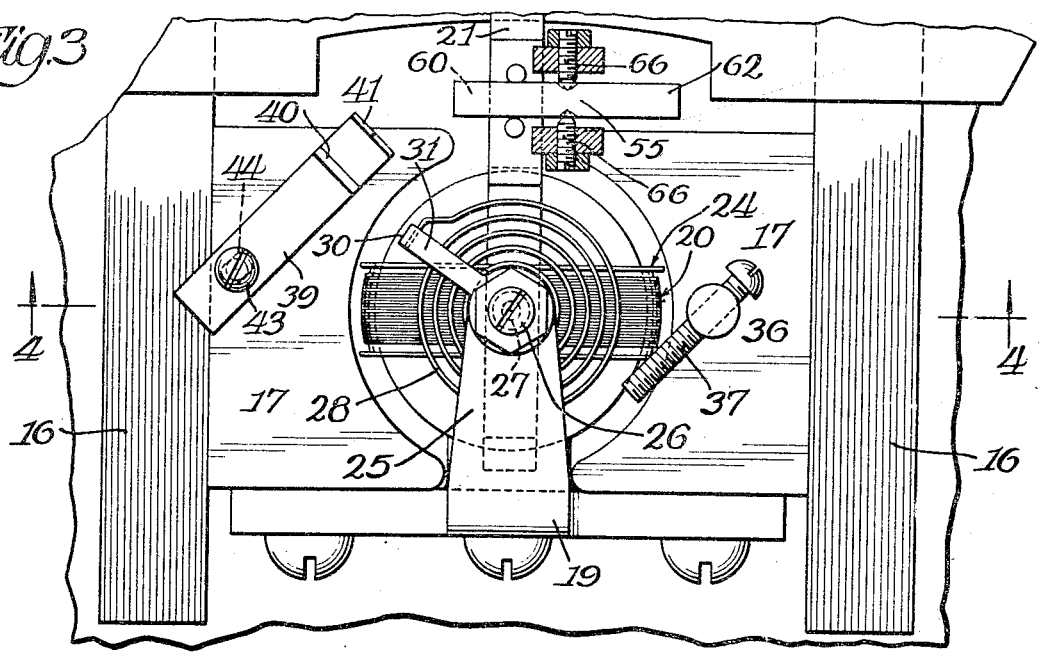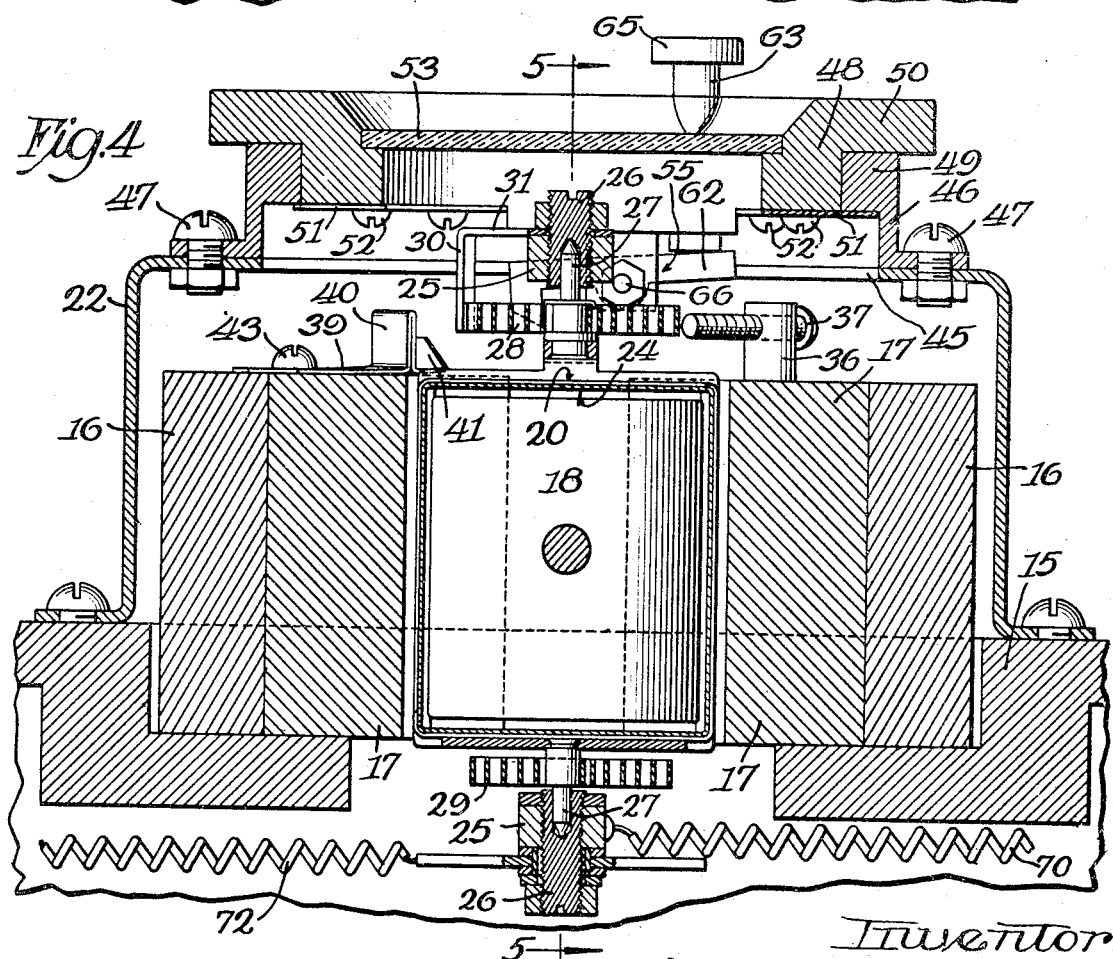

Inventor
Paul E. Klopsteg
By Wilson, Mann & Cox, Attys.

Patented Nov. 17, 1931

1,832,128

UNITED STATES PATENT OFFICE

PAUL E. KLOPSTEG, OF CHICAGO, ILLINOIS, ASSIGNOR TO CENTRAL SCIENTIFIC COMPANY, OF CHICAGO, ILLINOIS, A CORPORATION OF ILLINOIS

PROCESS AND APPARATUS FOR MEASURING MAGNETIC FIELD INTENSITIES

Application filed December 31, 1928. Serial No. 329,615.

The principal objects of the invention are to provide an improved process and apparatus for calibrating ballistic galvanometers, search coils and the like, used in measuring magnetic field intensities, and similar work; to eliminate calculations in determining magnetic field intensities, or total magnetic flux through a given area; to provide a wide range of calibration without change in connections, and to provide a simple instrument to replace the complicated or assorted devices commonly used in connection with circuits to be calibrated.

Further objects and advantages of the invention will become apparent as the disclosure proceeds and the description is read in connection with the accompanying drawings, in which—

Fig. 2 is a diagram illustrating the manner of connecting the instrument shown in Fig. 1 with a search coil and a galvanometer when the apparatus is to be used for measuring magnetic field intensities, and the like;

Fig. 3 is a plan view on an enlarged scale of the operating parts of the instrument shown in Fig. 1, the needle having been deflected to a position parallel with the long margin of the paper;

Fig. 4 is a sectional view taken on the line 4—4 of Fig. 3;

But these specific illustrations and the corresponding specific description are used solely for the purpose of disclosure, and are not to be construed as limiting the claims to the particular disclosure.

The fundamental procedure in measuring magnetic field intensities is substantially as follows:

(1) Make up a circuit including a search coil, a galvanometer and another, or other devices, depending on the type of apparatus being used.

(2) Insert the search coil into the field to be measured and bring the galvanometer to rest.

(3) Remove the search coil quickly and note the deflection of the galvanometer.

(4) Reproduce that deflection with suitable apparatus, giving certain values to be substituted in an equation, the solution of which will give the flux turns of the magnetic field within plus or minus one-half of one percent, if the operator is skillful and careful.

Apparatus including a Hibbert magnetic standard, a Duddell inductor, and a Mutual inductometer, and the processes of using them, are familiar, and I make no claim to them.

My invention simplifies the procedure and the apparatus, and produces an inductive impulse in the measuring circuit corresponding to a known value of flux turns.

Figure 2:
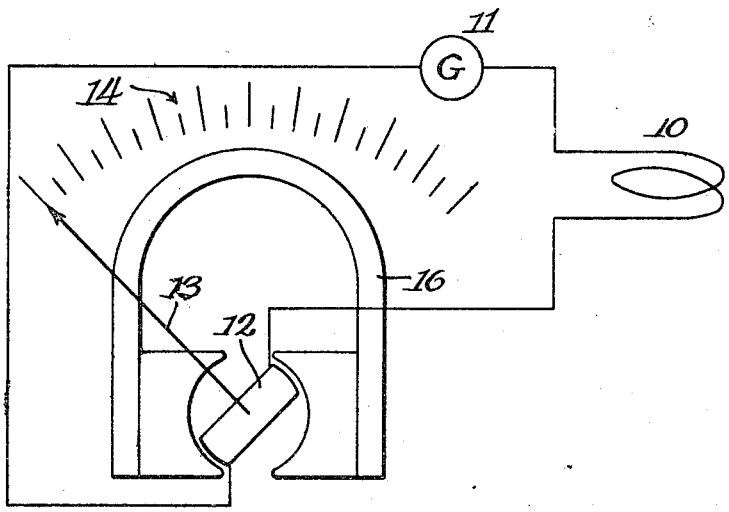

The general arrangement is illustrated in Fig. 2, where the search coil 10 and the galvanometer 11 are connected in series with the coil 12, mounted to rotate in a magnetic field, and equipped with a needle, or pointer, 13 for indicating, in flux turns on the scale 14, the quantity of electricity induced by a selected movement of the coil.

In use the procedure is as follows:

(1) The search coil 10 is introduced into the magnetic field and the galvanometer brought to rest.

(2) The search coil is removed quickly and the deflection of the galvanometer noted.

(3) The coil 12 is rotated clockwise a selected amount, the galvanometer brought to rest, the coil returned quickly to its original position, and the reading of the galvanometer noted.

By a few well selected operations a reading of the galvanometer, corresponding to that produced by the movement of the search coil, can be reproduced, and the needle 13 will indicate the flux turns on the scale 14.

Figure 1:
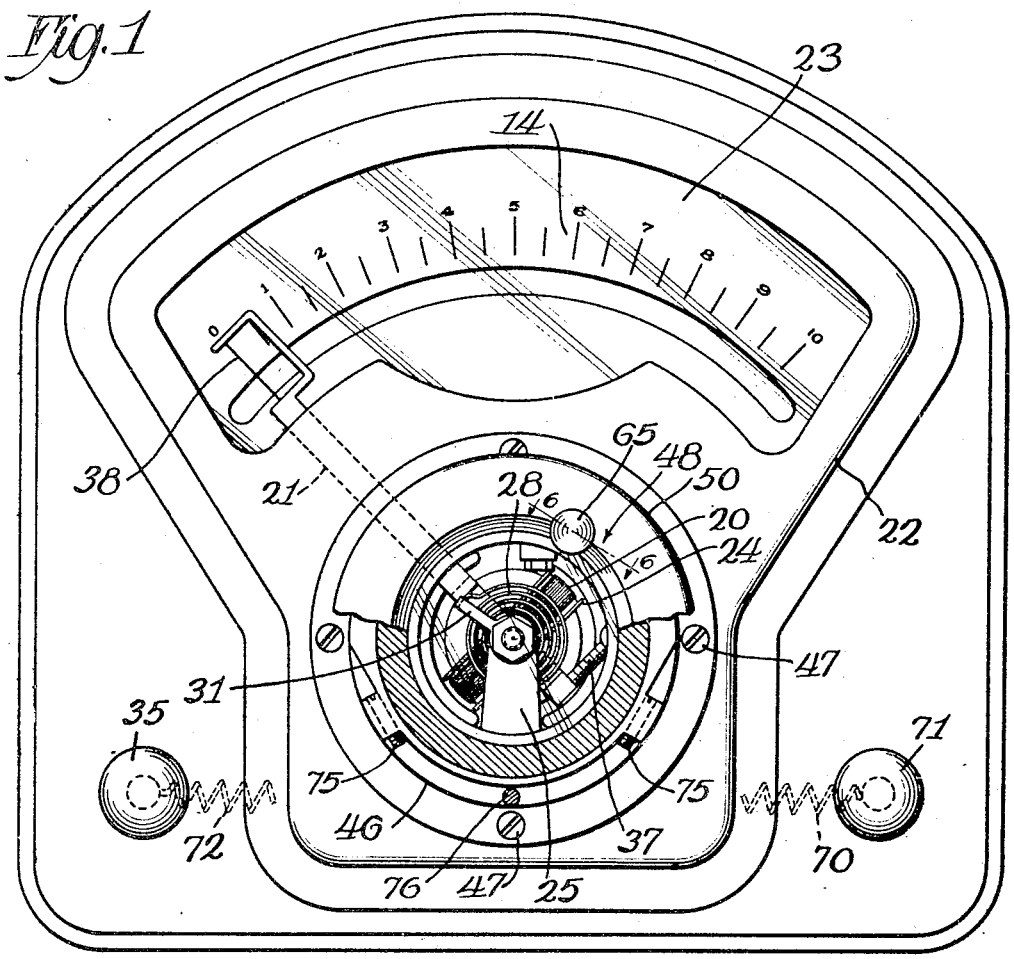
Fig. 1 is a plan view of an instrument embodying certain features of the invention.

The instrument shown in Fig. 1, which, for want of a well established name, may be called a variable magnetic inductor, is somewhat similar in general form and arrangement of parts to one type of ammeter, particularly as to the base 15 on which is mounted the horse-shoe magnet 16 equipped with soft iron pole pieces 17, cooperating with the soft iron core 18, carried by a yoke 19 to render the magnetic field uniform and radial, the armature coil 20, the needle or pointer 21, the casing or cover 22, and the window 23 therein.

In place of the usual mounting for the armature frame 24, the arms 25 of the yoke 19 are perforated and threaded to receive substantial bearings 26 for the pintles 27 of the frame.

Springs 28 and 29 of a familiar type, but of greater strength, are connected with the pintles 27 and constantly urge the armature to rotate counter-clockwise. The outer end of the spring 28 is connected with an arm 30 on a bracket 31 clamped to the upper pintle bearing 26. The outer end of the spring 29 is connected to a similar arm 32 on a bracket 33 clamped to the lower pintle bearing 26 and equipped with a finger piece 34 by which it may be rotated to adjust the spring tension.

One end of the armature coil 20 is connected through spring 28, the bracket 31, the yoke 19 and a wire 70, to the binding post 71, while the other end is connected through the spring 29, the bracket 33, and a wire 72 to the binding post 35.

On one of the pole pieces 17, as best shown in Figs. 3 and 4, is mounted a post 36 equipped with an adjusting screw 37, the end of which forms a definite limiting stop for the needle, or pointer 21, as shown in Fig. 1. And by the use of this screw the hair 38 (Fig. 1) of the needle, or pointer, can be accurately adjusted to correspond with zero on the scale 14.

Figure 6:
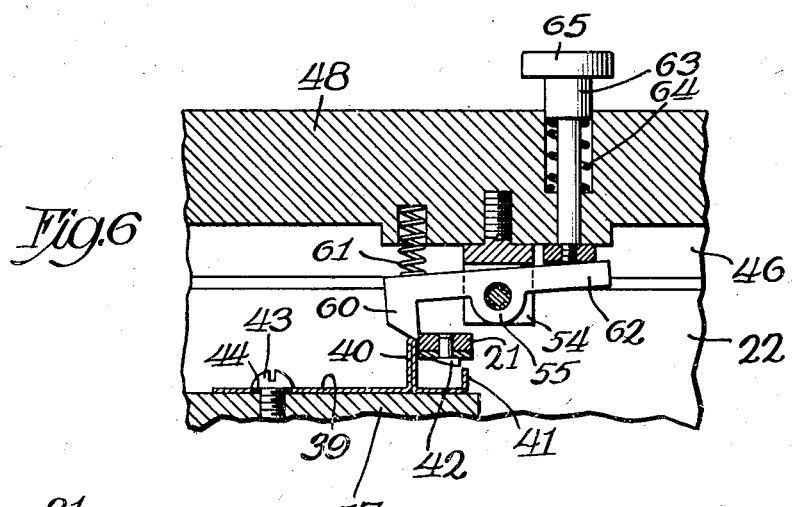
Fig. 6 is a sectional view taken on the line 6—6 of Fig. 1, the knob being shown as rotated to a position adjacent the zero setting of the needle.
Figure 7:
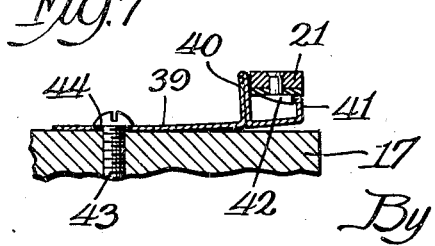
Fig. 7 is a view of the lower portion of Fig. 6, showing the parts in a different position.

The other pole piece 17, as best seen in Figs. 3, 4, 6 and 7, is equipped with a latch 39 to catch the needle at the zero position and prevent it from rebounding. It consists of a flat spring bent upon itself to form the stop 40 (Figs. 6 and 7) against which the needle 21 impinges at zero, and also bent upwardly at its end 41 to cooperate with an inclined lug 42 on the lower side of the needle, as best shown in Fig. 7, to prevent rebound.

This latch is made fast to the pole pieces by a screw 43 passing through a slot 44 whereby it may be adjusted to correspond with the setting of the screw 37.

The top of the casing 22 is provided with a circular opening 45 (Figs. 4 and 5) adjacent which a flanged ring 46 is made fast by bolt 47, and a knob 48 is swiveled to the flange 49 of the ring by the fixed rim 50, and the removable plate 51 held in place by the screw 52. The central portion of the knob is fitted with a glass 53 to permit inspection of the operating parts.

The underside of the knob 48 is equipped with a forked stud 54 (Fig. 6) in which is pivoted a pawl 55, having an inclined, hooked end 60, normally urged downwardly by the spring 61. The pawl also has a tail end 62 lying in the path of the plunger 63 normally held in raised position by a spring 64 and equipped with a push button 65.

Figure 5:
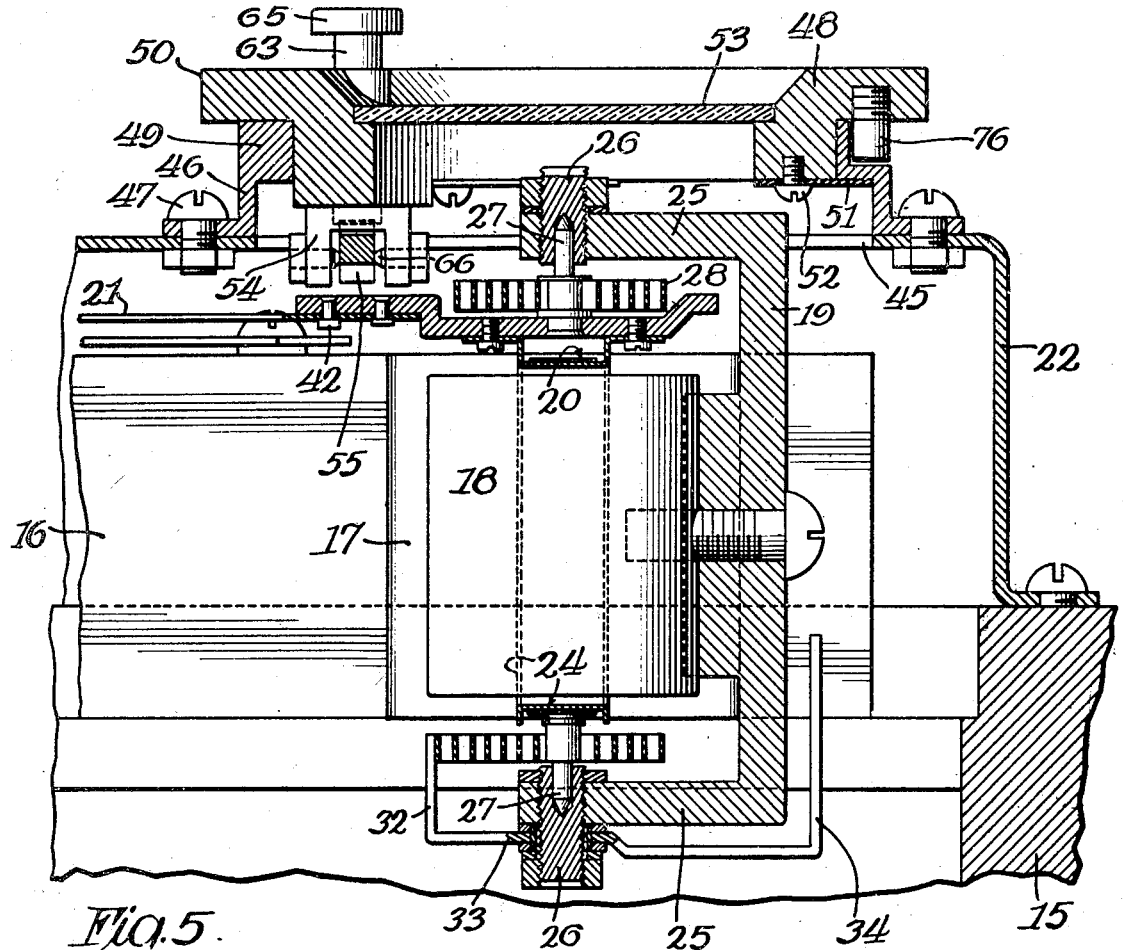
Fig. 5 is a sectional view taken on the line 5—5 of Fig. 4.

The pawl 55 is mounted on pintle bearings 66 in the manner best shown in Figs. 3 and 5.

Assuming now that the search coil has been quickly removed from the field to be measured and the reading of the galvanometer 11 has been noted, as above indicated, the normal operation is as follows:

(1) The knob 48 is rotated counter-clockwise until the pawl 55 rides over the needle 21 to the position shown in Fig. 6, in which the latch 39 is pressed to released position.

(2) The knob is rotated clockwise taking with it the needle 21, through an estimated deflection.

(3) The push button 65 is pressed down, (raising the hooked end 60 of the pawl 55, and releasing the needle and the armature, which under the constant urge of the springs 28 and 29, return quickly to zero position, where they are stopped and prevented from rebounding by the screw 37 of the latch 39) and the deflection of the galvanometer 11 is noted.

As a general thing this operation will have to be repeated several times before the galvanometer reading produced by the movement of the search coil can be reproduced by the movement of the armature 20.

When this has been accomplished, however, the corresponding movement of the needle or, more accurately, the setting of the needle, from which it is released to reproduce the galvanometer deflection, will indicate the flux turns on the scale 14.

It will be obvious that by a suitable selection of proportions the flux turns meter may be given a very wide range of accurate measurement and at the same time provide for abundant graduation of measurements in a single instrument or hook-up.

As compared with the Hibbert apparatus, and process, with its selection of coils or tappings, the Duddell inductor apparatus, with the multiplicity of coils in duplicate groups, and the Mutual inductometer apparatus with its primary and secondary coils, its batteries, variable resistance and switches, my apparatus is extremely simple and, in addition, it gives greater flexibility, wider range and furnishes the flux turns values without any calculations.

The ring 49 is equipped with adjustable stops 75 (Fig. 1) cooperating with a pin 76 (Figs. 1 and 5) on the knob 48 to limit the rotary movement of the knob.

I claim as my invention:

1. In a device of the class described, means to produce a magnetic field, a coil, means to mount the coil for rotary movement in the field, means to urge the coil to move in one direction, means to positively limit the movement of the coil in that direction, and means to prevent rebound of the coil from the limit of said movement.

2. In a device of the class described, means to produce a magnetic field, a coil, means to mount the coil for rotary movement in the field, means to urge the coil to move in one direction, means to positively limit the movement of the coil in that direction, means to move the coil to a desired setting and release it, and means to prevent rebound of the coil from the limit of said movement.

3. In a device of the class described, means to produce a magnetic field, a coil, means for mounting the coil to cut lines of force by a rotary movement, means for urging the coil to a definite position, means for limiting the movement of the coil in one direction to that definite position, and means for preventing recoil from that position.

4. In a device of the class described, means to produce a magnetic field, a coil, means to mount the coil for rotary movement in the field, means to urge the coil to move in one direction, means to positively limit the movement of the coil in that direction, an arm on the coil, and a latch engaging the arm to prevent rebound of the coil from the limit of said movement.

5. In a device of the class described, means to produce a magnetic field, a coil, means to mount the coil for rotary movement in the field, means to urge the coil to move in one direction, means to positively limit the movement of the coil in that direction, an arm on the coil, a latch engaging the arm to prevent rebound of the coil from the limit of said movement and means to release the latch and move the coil through a selected angle.

6. In a device of the class described, means to produce a magnetic field, a coil, means to mount the coil for rotary movement in the field, means to urge the coil to move in one direction, means to positively limit the movement of the coil in that direction, an arm on the coil, a latch engaging the arm to prevent rebound of the coil from the limit of said movement, a rotary operating member, and a pawl on the operating member adapted to engage the arm and release the latch.

7. In a device of the class described, means to produce a magnetic field, a coil, means to mount the coil for rotary movement in the field, means to urge the coil to move in one direction, means to positively limit the movement of the coil in that direction, an arm on the coil, a latch engaging the arm to prevent rebound of the coil from the limit of said movement, an operating member mounted to rotate about the axis of the coil, and means on the operating member for temporarily engaging the arm.

8. The process of calibrating a circuit including a search coil connected in series with a galvanometer and a generating instrument provided with a rotatable armature coil, the angular rotation of the armature coil being calibrated in flux turns of its field, which consists in rapidly moving the search coil from a field to be tested, noting the deflection of the galvanometer, then operating the armature coil to produce the same deflection and noting the angle through which the armature coil was rotated thereby indicating directly the flux turns cut by the exploring coil.

9. A magnetometric instrument including a coil mounted for rotation in a magnetic field of known strength, means to set the coil at one of a series of positions with respect to its final position, means to rotate the coil, means to release the coil from its set position, and means to measure the angle through which the coil has moved.

10. The process of determining the strength of an unknown magnetic field including a circuit having a search coil, a galvanometer and a rotatable armature coil of a generating instrument connected in series, which consists in moving the search coil in the field to be tested, noting the deflection of the galvanometer, then operating the armature coil to produce the same deflection, reading the angular movement directly in flux turns and thereby indicating directly the flux turns cut by the search coil.

In testimony whereof I affix my signature.

PAUL E. KLOPSTEG.